US011533579B2

(12) United States Patent
Sakuma

(10) Patent No.: US 11,533,579 B2
(45) Date of Patent: Dec. 20, 2022

(54) HEAD-MOUNTED DISPLAY APPARATUS, SOUND IMAGE OUTPUT SYSTEM, AND METHOD OF OUTPUTTING SOUND IMAGE

(71) Applicant: SEIKO EPSON CORPORATION, Tokyo (JP)

(72) Inventor: Wataru Sakuma, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/236,603

(22) Filed: Apr. 21, 2021

(65) Prior Publication Data

US 2021/0337341 A1    Oct. 28, 2021

(30) Foreign Application Priority Data

Apr. 22, 2020    (JP) .............................. JP2020-075807

(51) Int. Cl.
| | |
|---|---|
| *H04S 7/00* | (2006.01) |
| *G06T 7/70* | (2017.01) |
| *G06T 19/00* | (2011.01) |
| *G10K 15/02* | (2006.01) |
| *H04S 1/00* | (2006.01) |
| *H04R 5/033* | (2006.01) |

(52) U.S. Cl.
CPC ................ *H04S 7/304* (2013.01); *G06T 7/70* (2017.01); *G06T 19/006* (2013.01); *G10K 15/02* (2013.01); *H04R 5/033* (2013.01); *H04S 1/007* (2013.01); *H04S 2400/11* (2013.01); *H04S 2400/15* (2013.01)

(58) Field of Classification Search
CPC ........ H04S 7/304; H04S 2400/11; H04S 7/00; H04S 1/00; G10K 15/02; G06T 7/70; H04R 5/033
USPC .......................... 381/303, 310, 367, 370, 376
See application file for complete search history.

(56) References Cited

U.S. PATENT DOCUMENTS

2010/0265164 A1* 10/2010 Okuno .................... H04S 7/304
345/8

FOREIGN PATENT DOCUMENTS

| | | | |
|---|---|---|---|
| CN | 107367839 | * 11/2017 | ............. G02B 27/01 |
| JP | 2009-116690 A | 5/2009 | |

* cited by examiner

*Primary Examiner* — Yosef K Laekemariam
(74) *Attorney, Agent, or Firm* — Oliff PLC

(57) ABSTRACT

An HMD includes a display unit mounted on a head of a user, and configured to display an image such that a real object located in a real space is visually recognizable, a right earphone and a left earphone configured to output a sound, a position specification unit configured to specify a position of the real object and a virtual object, and a sound output control unit configured to generate a synthesized sound with the position of the virtual object as a sound source position, and output the synthesized sound from the right earphone and the left earphone. The sound output control unit adjusts the synthesized sound so that the synthesized sound becomes an audible sound bypassing the real object when the position of the real object is located between the position of the virtual object and a position of the display unit.

9 Claims, 9 Drawing Sheets

HEAD-MOUNTED DISPLAY APPARATUS, SOUND IMAGE OUTPUT SYSTEM, AND METHOD OF OUTPUTTING SOUND IMAGE

The present application is based on, and claims priority from JP Application Serial Number 2020-075807, filed Apr. 22, 2020, the disclosure of which is hereby incorporated by reference herein in its entirety.

BACKGROUND

1. Technical Field

The present disclosure relates to a head-mounted display apparatus, a sound image output system, and a method of outputting a sound image.

2. Related Art

A technique for displaying an image of a virtual object has been known in a display device such as a head-mounted display. A device described in JP-A-2009-116690 reduces the volume of a sound emitted from a real object in a real space when it is determined that the sound emitted from the real object is blocked by a virtual object.

When an image of a virtual object is displayed, it is also conceivable to output a sound as if the virtual object emitted the sound. In such a case, it is conceivable to change the sound emitted from the virtual object according to an object in the real space, but there has been no such a proposal.

SUMMARY

An aspect of solving the above-described problems is a head-mounted display apparatus that includes a display unit mounted on a head of a user, and configured to display an image such that a real object located in a real space is visually recognizable, a sound output unit configured to output a sound, a position specification unit configured to specify a position of the real object and a virtual object, and a sound output control unit configured to generate a synthesized sound with the position of the virtual object as a sound source position, and output the synthesized sound from the sound output unit, where the sound output control unit adjusts the synthesized sound to change three-dimensionally according to the real object when the position of the real object is located between the position of the virtual object and a position of the display unit.

Another aspect of solving the above-described problems is a sound image output system that includes a head-mounted display unit mounted on a head of a user, and configured to display an image such that a real object located in a real space is visually recognizable, a sound output unit configured to output a sound, a position specification unit configured to specify a position of the real object and a virtual object, a sound output control unit configured to generate a synthesized sound with the position of the virtual object as a sound source position, and output the synthesized sound from the sound output unit, and a display control unit configured to display an image of the virtual object on the display unit, based on the position of the virtual object specified by the position specification unit, where the sound output control unit adjusts the synthesized sound to change three-dimensionally according to the real object when the position of the real object is located between the position of the virtual object and a position of the display unit.

Still another aspect of solving the above-described problems is a sound image output method using a head-mounted display unit mounted on a head of a user, and configured to display an image such that a real object located in a real space is visually recognizable, and a sound output unit configured to output a sound, and the sound image output method includes specifying a position of the real object and a virtual object, displaying an image of the virtual object on the display unit, based on the specified position of the virtual object, generating a synthesized sound with the position of the virtual object as a sound source position, adjusting the synthesized sound to change three-dimensionally according to the real object when the position of the real object is located between the position of the virtual object and a position of the display unit, and outputting the adjusted synthesized sound from the sound output unit.

DESCRIPTION OF EXEMPLARY EMBODIMENTS

Exemplary embodiments are described below with reference to the accompanying drawings.

1. Overall Configuration of Display System

Figure 1:
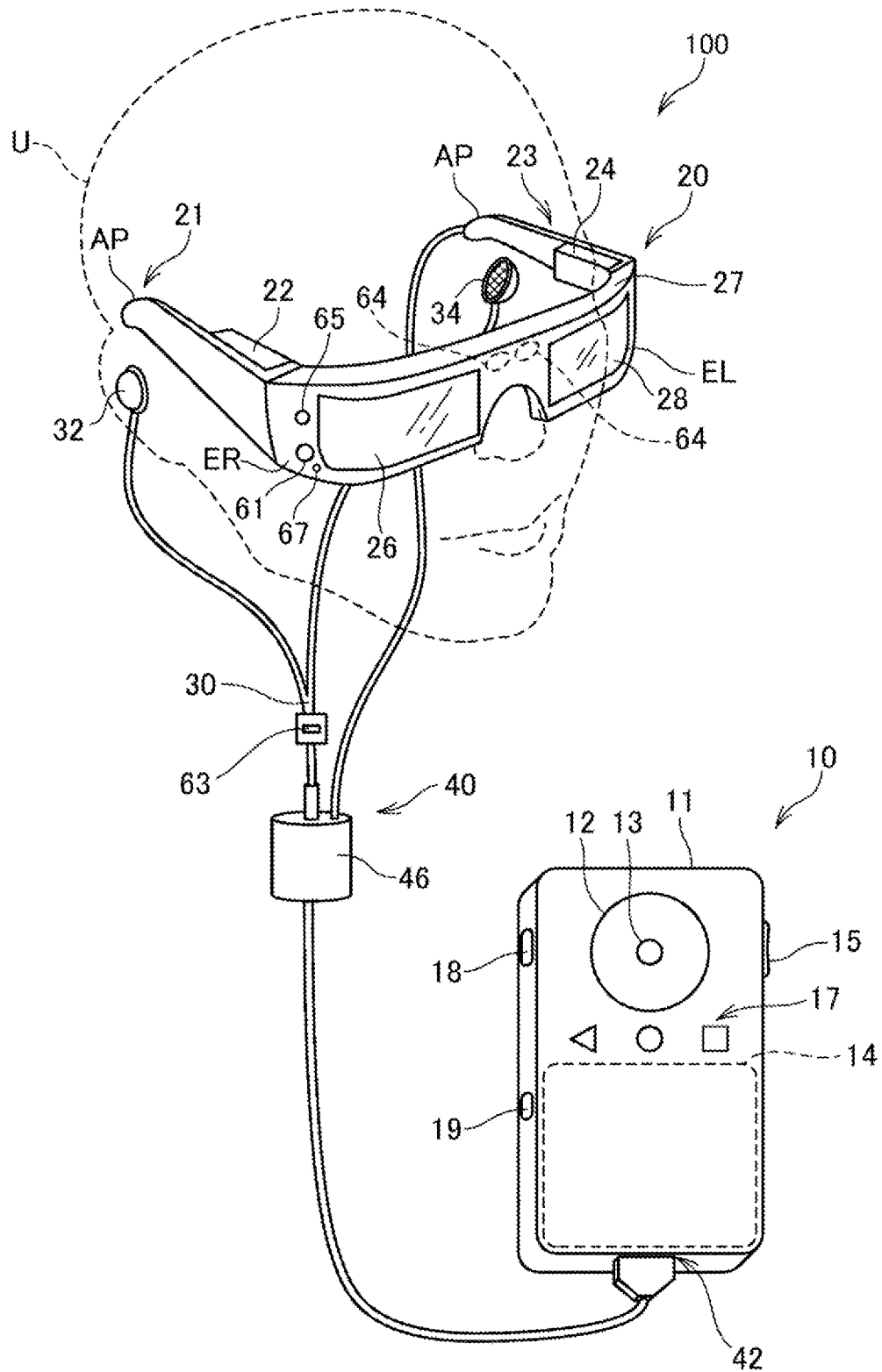
FIG. 1 is a diagram illustrating a configuration of a display system.

FIG. 1 is a diagram illustrating a schematic configuration of a display system 1.

As illustrated in FIG. 1, the display system 1 includes an HMD 100. The HMD 100 is a head-mounted display apparatus worn by a user U on a head. The HMD 100 is a display apparatus of a transparent type that allows the user U to directly visually recognize an outside scene while visually recognizing a virtual image. Here, the outside scene refers to a scene in a real space that is a scene outside the user U wearing the HMD 100 and is visually recognizable by a naked eye even when the user U is not wearing a display unit 20. It can also be said that the user U is a user of the HMD 100 and an operator. HMD is an abbreviation for Head Mounted Display. The display system 1 corresponds to an example of a sound image output system.

The HMD 100 includes the display unit 20 worn by the user U on the head, and a controller 10 configured to control the display unit 20. The display unit 20 allows the user U to visually recognize a virtual image while being mounted on the head of the user U. The controller 10 functions as a control device used to operate the HMD 100 by the user U. The display unit 20 corresponds to an example of a display unit.

In the following description, a virtual image visually recognized by the user U via the display unit 20 is referred to as a display image for convenience. Emitting imaging light based on image data from the display unit 20 by the HMD 100 is expressed as displaying an image. The image is not limited to a still image, but also includes a moving image or video. The configuration is an example, and, for example, the HMD 100 may not be optically transparent. In this case, the HMD 100 may be a so-called video see-through type display apparatus that allows the user U to indirectly visually recognize an outside scene by capturing the outside scene and displaying a captured image.

The controller 10 includes a main body 11 having a box shape. The main body 11 includes various switches and the like as an operator that receives an operation of the user U. The display unit 20 has an eyeglasses-like shape in the present exemplary embodiment. The display unit 20 includes a main body constituted by a right holding part 21, a left holding part 23, and a front frame 27. The main body of the display unit 20 is provided with a right display unit 22, a left display unit 24, a right light-guiding plate 26, and a left light-guiding plate 28.

The right holding part 21 and the left holding part 23 extend rearward from corresponding ends of the front frame 27, to hold the display unit 20 on the head of the user U. One of the ends of the front frame 27, which lies on the right side of the user U when the user U wears the display unit 20, is referred to as an end ER, while the other one of the ends, which lies on the left side, is referred to as an end EL.

The right light-guiding plate 26 and the left light-guiding plate 28 are provided on the front frame 27. While the display unit 20 is worn, the right light-guiding plate 26 lies in front of a right eye of the user U. The left light-guiding plate 28 lies in front of a left eye of the user U.

The right display unit 22 and the left display unit 24 are modules obtained by unitizing an optical unit and a peripheral circuit. The right display unit 22 is attached to the right holding part 21, and the left display unit 24 is attached to the left holding part 23. The right display unit 22 and the left display unit 24 emit imaging light based on image data.

The right light-guiding plate 26 and the left light-guiding plate 28 are optical components made of an optically transparent resin or the like. The right light-guiding plate 26 and the left light-guiding plate 28 are prisms, for example. The right light-guiding plate 26 guides imaging light output from the right display unit 22 to the right eye of the user U. The left light-guiding plate 28 guides imaging light output from the left display unit 24 to the left eye of the user U. Therefore, the imaging light is incident on both of the eyes of the user U. The user U can thus visually recognize an image.

The imaging light guided by the right light-guiding plate 26 and outside light transmitted through the right light-guiding plate 26 are incident on the right eye of the user U. The imaging light guided by the left light-guiding plate 28 and outside light transmitted through the left light-guiding plate 28 are incident on the left eye of the user U. In other words, the HMD 100 superimposes the imaging light corresponding to an internally processed image and the outside light, and causes the superimposed light to be incident on the eyes of the user U. The user U can see an outside scene through the right light-guiding plate 26 and the left light-guiding plate 28. Furthermore, the user U can see the image by the imaging light in a manner overlapping the outside scene.

A shade that attenuates the outside light incident on the right eye and the left eye of the user U may be provided on surfaces of the right light-guiding plate 26 and the left light-guiding plate 28. The shade may be an electronic shade capable of electrically adjusting transmittance of light.

An illuminance sensor 65 is disposed on the front frame 27. The illuminance sensor 65 receives outside light from the front of the user U wearing the display unit 20.

An outer camera 61 is disposed on the front frame 27. In the example in FIG. 1, the outer camera 61 is located on the end ER side of the front frame 27. The outer camera 61 is a digital camera that captures an imaging range including the front of the user U. The outer camera 61 is provided in a position so as not block the outside light passing through the right light-guiding plate 26 and the left light-guiding plate 28. The position of the outer camera 61 is not limited to the example in FIG. 1. The outer camera 61 may be disposed on the end EL side or may be disposed on a coupling portion of the right light-guiding plate 26 and the left light-guiding plate 28. The outer camera 61 corresponds to an example of an imaging unit.

The outer camera 61 is a digital camera including an imaging element such as a CCD and a CMOS and an imaging lens. The outer camera 61 according to the present exemplary embodiment is a monocular camera, but may be a stereo camera. The outer camera 61 captures an image in accordance with control by a control unit 150, and outputs captured image data to the control unit 150. The outer camera 61 includes an imaging lens. The imaging lens of the outer camera 61 may be a so-called wide angle lens. The wide angle lens may be a lens referred to as a super-wide angle lens or a semi-wide angle lens. The imagining lens of the outer camera 61 may also be a fixed focal lens, a zoom lens, or a lens group including a plurality of lenses. The outer camera 61 corresponds to an example of an imaging unit. CCD is an abbreviation for Charge Coupled Device. CMOS is an abbreviation for Complementary Metal-Oxide-Semiconductor.

An LED indicator 67 is disposed on the front frame 27. The LED indicator 67 is disposed near the outer camera 61 at the end ER, and lights up while the camera 61 is operating to notify that the capturing is in progress. LED is an abbreviation for Light Emitting Diode.

A distance sensor 64 is provided on the front frame 27. The distance sensor 64 detects a distance to a target object to be measured located in front of the user U. The target object to be measured is a real object or structure located in the real space. The distance sensor 64 may be, for example, a light reflective distance sensor. Specifically, examples of the distance sensor 64 include a sensor including a light source, such as an LED or a laser diode, and a light-receiving unit configured to receive reflected light obtained by light emitted from the light source being reflected by the target object to be measured. Further, the distance sensor 64 may also be an ultrasonic wave type distance sensor. In other words, the distance sensor 64 may include a sound source configured to generate ultrasonic waves, and a detector configured to receive the ultrasonic waves reflected by a target object to be measured. Further, the distance sensor 64 may be a laser range scanner also referred to as a scanning range sensor.

The controller 10 and the display unit 20 are coupled via a coupling cable 40. The coupling cable 40 is detachably coupled to a conductive connector 42 of the main body 11.

The coupling cable 40 includes an audio connector 46. The audio connector 46 is coupled to a headset 30. The headset 30 includes a right earphone 32 and a left earphone 34 constituting a stereo headphone, and a microphone 63.

The right earphone 32 is mounted on a right ear of the user U. The left earphone 34 is mounted on a left ear of the user U. The right earphone 32 and the left earphone 34 are inner ear type earphones or canal-shaped earphones. The right earphone 32 and the left earphone 34 may be an overhead type headphone that contacts auricles via ear muffs. The right earphone 32 and the left earphone 34 output a sound based on a sound signal output from a sound interface 181 described later. The right earphone 32 and the left earphone 34 correspond to an example of a sound output unit, the right earphone 32 corresponds to an example of a first sound output unit, and the left earphone 34 corresponds to an example of a second sound output unit.

The microphone 63 collects sound and outputs a sound signal to the sound interface 181. The microphone 63 may be a monaural microphone or a stereo microphone. The microphone 63 may be a directional microphone or a non-directional microphone.

The controller 10 includes a wheel operation unit 12, a central key 13, an operation pad 14, an up-down key 15, an LED display unit 17, and a power switch 18. The components can be referred to as parts to be operated being operated by the user U. The parts to be operated are arranged on a surface of the main body 11. The parts to be operated are operated with a hand or a finger of the user U, for example.

The LED display unit 17 is installed on the main body 11. The LED display unit 17 is an LED indicator that indicates an operation state of the HMD 100. The LED display unit 17 is covered with a transparent portion that can transmit light. The cover of the LED display unit 17 constitutes a part of the surface of the main body 11. When the LED display unit 17 emits light, the light is transmitted through the transparent portion. In this way, characters, symbols, patterns, and the like formed in the transparent portion can be visually recognized.

A touch sensor that detects contact of a finger of the user U is disposed on the LED display unit 17 in a manner overlapping the transparent portion. A combination of the LED display unit 17 and the touch sensor serves as a software key.

The power switch 18 is a switch used to turn on or off a power supply to the HMD 100. The main body 11 includes a USB connector 19 as an interface for coupling the controller 10 to external devices. USB is an abbreviation for Universal Serial Bus.

Figure 3:
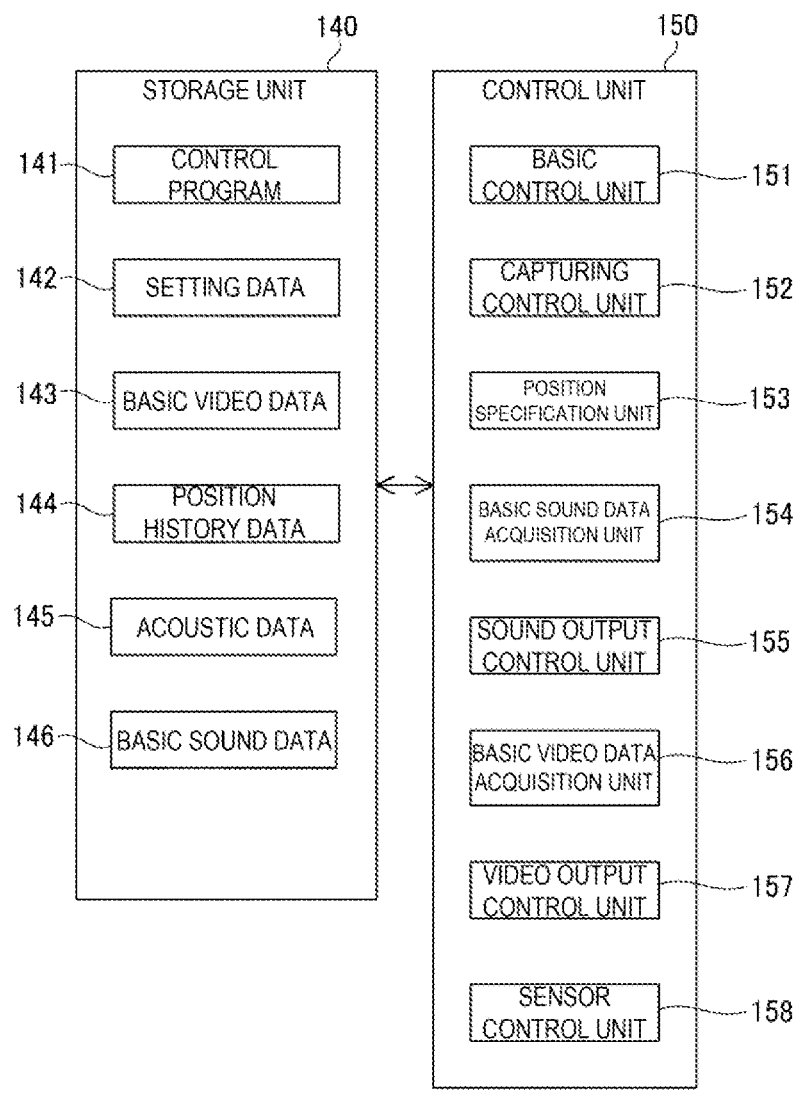
FIG. 3 is a functional block diagram of a control system of the HMD.

FIG. 3 illustrates an inner camera 68 included in the HMD 100. The inner camera 68 is installed in a position facing a face of the user U in the display unit 20, and is disposed toward the right eye and the left eye. The inner camera 68 captures the right eye and the left eye. The HMD 100 can specify a direction of a line-of-sight of the right eye and a line-of-sight of the left eye by the captured image of the inner camera 68. Further, the HMD 100 can detect the size of the pupils of the right eye and the left eye by analyzing the captured image of the inner camera 68. The HMD 100 may specify a state of miosis or dilation of the pupils of the user U, based on a change in the size of the pupils. Further, the HMD 100 may detect an open/closed state of the eyelids of the right eye and the left eye, based on the captured image of the inner camera 68.

2. Configuration of HMD

Figure 4:
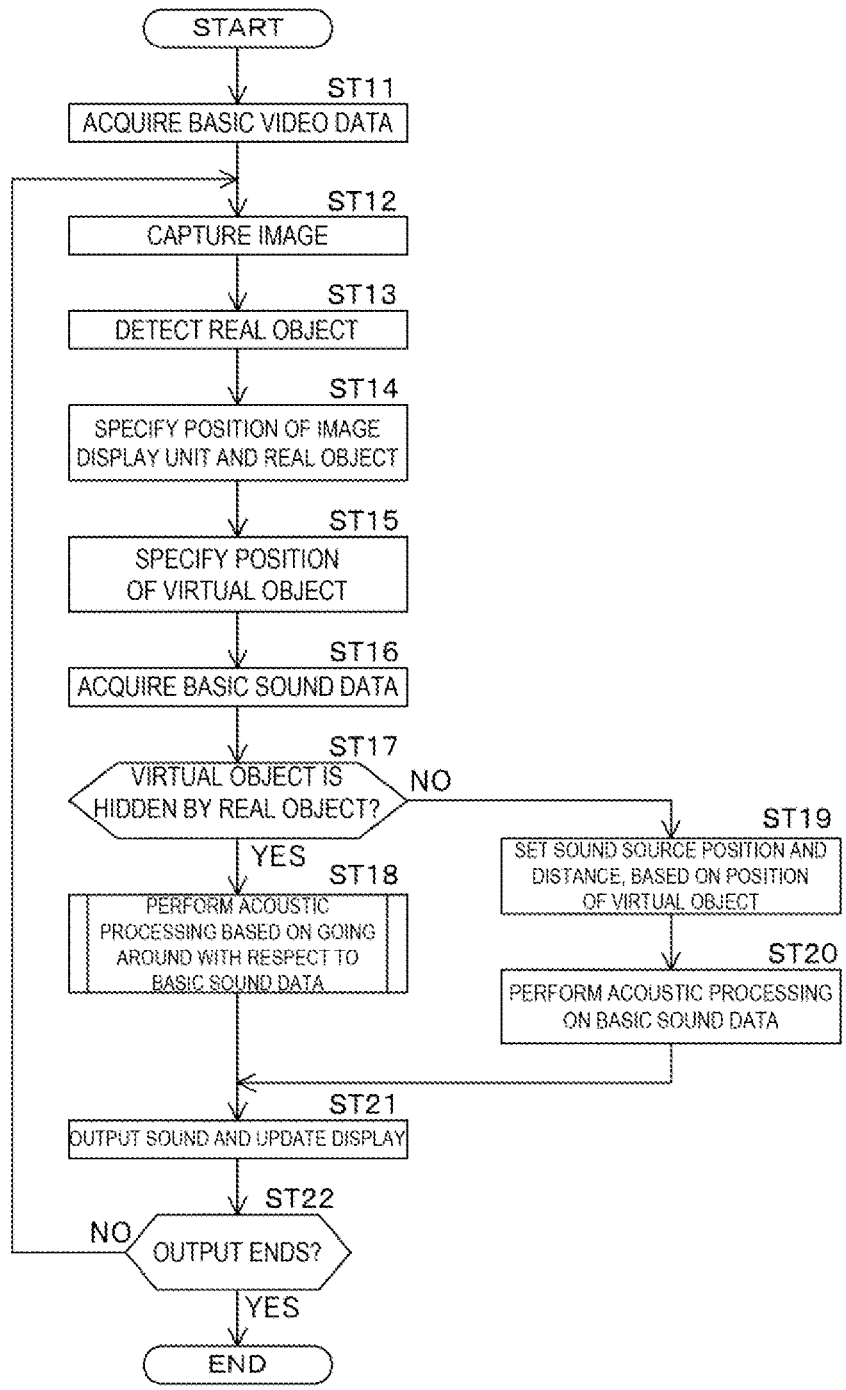
FIG. 4 is a flowchart illustrating operations of the HMD.

FIG. 4 is a block diagram illustrating a configuration of components constituting the HMD 100.

The controller 10 includes a main processor 125. The main processor 125 is constituted by a CPU, a microcomputer, or the like. The main processor 125 is coupled to a memory 118 and a non-volatile storage unit 121. The main processor 125 is coupled to an operation unit 170 as an input device. The main processor 125 is coupled to sensors including a six-axis sensor 111, a magnetic sensor 113, and a GPS reception unit 115.

The main processor 125 is coupled to a communication unit 117, a sound processing unit 180, an external memory interface 191, the USB connector 19, a sensor hub 193, and an FPGA 194. The components function as an interface to external devices. In the following description and drawings, an interface is abbreviated as an I/F. FPGA is an abbreviation for Field Programmable Gate Array.

The controller 10 includes a control substrate. The main processor 125 is mounted on the control substrate. The six-axis sensor 111, the magnetic sensor 113, the GPS reception unit 115, the communication unit 117, the memory 118, the non-volatile storage unit 121, the sound processing unit 180, and the like may be mounted on the control substrate. The external memory interface 191, the USB connector 19, the sensor hub 193, the FPGA 194, and an interface 197 may be mounted on the control substrate. Furthermore, the conductive connector 42 and the USB connector 19 may be mounted on the control substrate.

The memory 118 configures a work area used to temporarily store a program to be executed by the main processor 125, data to be processed by the main processor 125, and the like. The non-volatile storage unit 121 is constituted by a semiconductor memory device such as a flash memory. The non-volatile storage unit 121 stores a program to be executed by the main processor 125 and data to be processed by the main processor 125.

The operation unit 170 detects an operation on the touch sensor disposed on the LED display unit 17, the wheel operation unit 12, the central key 13, the operation pad 14, the up-down key 15, and the power switch 18. The operation unit 170 outputs an operation signal corresponding to an operation to the main processor 125. The operation unit 170 turns on, blinks, or turns off the LED display unit 17 in accordance with the control by the main processor 125.

The six-axis sensor 111 is an example of a motion sensor configured to detect a movement of the controller 10. In addition, a motion sensor may be paraphrased as an inertial sensor. The six-axis sensor 111 includes a three-axis acceleration sensor and a three-axis gyro sensor. The magnetic sensor 113 is a three-axis geomagnetic sensor, for example. The six-axis sensor 111 may be an IMU with the acceleration sensor and the gyro sensor formed into a module. IMU is an abbreviation for Inertial Measurement Unit. Further, the six-axis sensor 111 and the magnetic sensor 113 may be a modular configuration.

The GPS reception unit 115 receives a GPS signal by a GPS satellite, which is not illustrated. The GPS reception unit 115 detects or calculates coordinates of a current position of the controller 10, based on a GPS signal. GPS is an abbreviation for Global Positioning System.

The six-axis sensor 111, the magnetic sensor 113, and the GPS reception unit 115 output an output value to the main processor 125 in accordance with a predetermined sampling period. The six-axis sensor 111, the magnetic sensor 113, and the GPS reception unit 115 may also output detected values to the main processor 125 in response to the requests from the main processor 125.

The communication unit 117 is a communication device configured to perform wireless communication with an external device. The communication unit 117 includes an antenna, a radio frequency (RF) circuit, a baseband circuit, a communication control circuit, and the like, which are not illustrated. The communication unit 117 performs wireless communication in conformity with standards such as Bluetooth and a wireless LAN including Wi-Fi. RF is an abbreviation for Radio Frequency. Bluetooth is a registered trademark. Wi-Fi is a registered trademark.

The sound interface 181 is coupled to the right earphone 32, the left earphone 34, and the microphone 63 via the audio connector 46. The sound interface 181 outputs a sound signal to each of the right earphone 32 and the left earphone 34 in accordance with the control by the main processor 125, and outputs a sound. The sound interface 181 outputs the sound signal input from the microphone 63 to the main processor 125. The sound interface 181 may include a converter that converts an analog sound signal and digital sound data. In this case, digital sound data is input and output between the sound interface 181 and the main processor 125.

The HMD 100 can process a stereo sound. Specifically, the sound interface 181 can output, from the right earphone 32 and the left earphone 34, stereo sounds of two channels including a channel corresponding to each of the right ear and the left ear of the user U.

The external memory interface 191 serves as an interface configured to be coupled to a portable memory device, and includes an interface circuit and a memory card slot configured to be attached with a card-type recording medium to read data, for example.

The interface 197 couples the sensor hub 193 and the FPGA 194 to the display unit 20.

The sensor hub 193 acquires detected values of various sensors included in the display unit 20, and outputs the detected values to the main processor 125. The FPGA 194 processes data to be transmitted and received between the main processor 125 and components of the display unit 20, and performs transmission via the interface 197.

The display unit 20 includes a right angle sensor 183 and a left angle sensor 184.

The display unit 20 has an eyeglasses-like shape as described above, and the right holding part 21 and the left holding part 23 are members similar to temples of eyeglasses. The right holding part 21 and the left holding part 23 are each rotatable relative to the front frame 27. For example, the right holding part 21 and the left holding part 23 are each coupled to the front frame 27 by a hinge structure. With the user U wearing the display unit 20, the right holding part 21 and the left holding part 23 are open at an angle matching the size of the head of the user U.

The right angle sensor 183 is provided on a coupling portion of the front frame 27 and the right holding part 21, and detects an angle of the right holding part 21 with respect to the front frame 27. The left angle sensor 184 is provided on a coupling portion of the front frame 27 and the left holding part 23, and detects an angle of the left holding part 23 with respect to the front frame 27. The detected values of the right angle sensor 183 and the left angle sensor 184 are output to the main processor 125.

With the coupling cable 40 and wires (not illustrated) inside the display unit 20, the controller 10 is separately coupled to the right display unit 22 and the left display unit 24.

The right display unit 22 includes an OLED unit 221 configured to emit imaging light. The imaging light emitted from the OLED unit 221 is guided to the right light-guiding plate 26 by an optical system including a lens group and the like. The left display unit 24 includes an OLED unit 241 configured to emit imaging light. The imaging light emitted from the OLED unit 241 is guided to the left light-guiding plate 28 by an optical system including a lens group and the like. OLED is an abbreviation for Organic Light Emitting Diode.

The OLED units 221 and 241 include an OLED panel and a drive circuit configured to drive the OLED panel. The OLED panel is a light emission type display panel configured to emit light by organic electro-luminescence. The OLED panel includes light-emitting elements arranged in a matrix and each configured to emit, for example, red (R) color light, green (G) color light, or blue (B) color light. The drive circuit selects and powers the light-emitting elements of the OLED panel in accordance with the control by the main processor 125, and causes the light-emitting elements of the OLED panel to emit light. In this way, the OLED units 221 and 241 form imaging light, and the imaging light is incident on the right eye and the left eye of the user U via the right light-guiding plate 26 and the left light-guiding plate 28.

The right display unit 22 includes a display unit substrate 210. An interface 211, a reception unit 213, and an EEPROM 215 are mounted on the display unit substrate 210. The interface 211 is coupled to the interface 197. The interface 211 couples the reception unit 213, the EEPROM 215, a temperature sensor 66, the outer camera 61, the illumination sensor 65, and the LED indicator 67, to the controller 10. The reception unit 213 receives data input from the controller 10 via the interface 211. In the drawings, the reception unit 213 is abbreviated as Rx.

The EEPROM 215 stores data. The EEPROM 215 stores, for example, data about light-emitting properties and display properties of the OLED units 221 and 241, data about a property of a sensor provided in the right display unit 22 or the left display unit 24, and the like. The data stored in the EEPROM 215 can be read by the main processor 125. EEPROM is an abbreviation for Electrically Erasable Programmable Read-Only Memory.

Captured image data or a signal indicating a capturing result of the outer camera 61 is input from the outer camera 61 to the interface 211. A measurement result obtained by measuring a distance from the distance sensor 64 to a target object located in the detection range of the distance sensor 64 is input to the interface 211. A detection value corresponding to the amount of received light and/or intensity of received light is input from the illuminance sensor 65 to the interface 211. A voltage value or a resistance value corresponding to a temperature detected by the temperature sensor 66 is input from the temperature sensor 66 to the interface 211. The temperature sensor 66 detects a temperature of the OLED panel included in the OLED unit 221. When the OLED panel is mounted, together with the drive circuit and the like, on an integrated circuit on an integrated semiconductor chip, the temperature sensor 66 may be mounted on the semiconductor chip.

The LED indicator 67 turns on and off in accordance with a signal input via the interface 211. The inner camera 68 captures an image, and outputs captured image data or a signal indicating a capturing result to the interface 211. The reception unit 213 receives data transmitted by the main processor 125 via the interface 211. The reception unit 213 outputs the image data received via the interface 211, and outputs the received image data to the OLED unit 221.

The left display unit 24 includes a display unit substrate 230. An interface 231 and a reception unit 233 are mounted on the display unit substrate 230. A six-axis sensor 235 and a magnetic sensor 237 are mounted on the display unit substrate 230. The interface 231 couples the reception unit 233, the six-axis sensor 235, and the magnetic sensor 237 to the controller 10. The reception unit 233 receives data input from the control device 10 via the interface 231.

The six-axis sensor 235 is an example of a motion sensor configured to detect a movement of the display unit 20. The six-axis sensor 235 includes a three-axis acceleration sensor and a three-axis gyro sensor. The six-axis sensor 235 may be an IMU with the sensors, described above, formed into a module. The magnetic sensor 237 is a three-axis geomagnetic sensor, for example. The six-axis sensor 235 and the magnetic sensor 237 output detection values or detection data to the interface 231. The detection values or the detection data are output to the main processor 125 via the interface 231.

The outer camera 61, the distance sensor 64, the illuminance sensor 65, the temperature sensor 66, the inner camera 68, the six-axis sensor 235, and the magnetic sensor 237 are coupled to the sensor hub 193 of the controller 10. A control signal is input from the sensor hub 193 to each of the sensors. The LED indicator 67 is also coupled to the sensor hub 193.

The sensor hub 193 sets and initializes sampling periods of the sensors in accordance with the control by the main processor 125. Based on the sampling periods of the sensors, the sensor hub 193 supplies power to the sensors, transmits control data, and acquires detected values, for example. At a preset timing, the sensor hub 193 outputs detected values of the sensors to the main processor 125. The sensor hub 193 starts and stops supplying power to the LED indicator 67 in accordance with the control by the main processor 125, and turns on or off the LED indicator 67 in accordance with the timing when the outer camera 61 starts and ends capturing images.

3. Control System of HMD

FIG. 3 is a functional block diagram of a control system of the HMD 100. The control system of the HMD 100 includes a storage unit 140 and the control unit 150. The storage unit 140 is a logical storage unit constituted by the non-volatile storage unit 121, and may include the EEPROM 215. The control unit 150 and various functional units included in the control unit 150 are formed by the main processor 125 executing a control program 141 and software and hardware working together.

The storage unit 140 stores the control program 141, setting data 142, basic video data 143, position history data 144, acoustic data 145, and basic sound data 146.

The setting data 142 includes various set values for operations of the HMD 100. The setting data 142 may include parameters, determinants, computing equations, LUTs, and the like used when the control unit 150 controls the HMD 100. LUT is an abbreviation for LookUp Table.

The basic video data 143 is data based on video or an image displayed by the control unit 150 on the display unit 20. The basic video data 143 includes data of a virtual object displayed in a manner overlapping the real space that is visually recognized by the user U through the display unit 20. The data may be image data, video data, or 3D data for generating image data of a virtual object. Further, the basic video data 143 may be, for example, data of a video content displayed by the display unit 20.

A virtual object is an image representing a virtual object that is not present in the real space. The HMD 100 sets a position of a virtual object in the real space. The HMD 100 displays, by the display unit 20, an image representing a state where the virtual object is disposed in the set position. The position of the virtual object is set in, for example, the real space in a range visually recognized by the user U through the display unit 20.

The position history data 144 is data that includes a position of the virtual object. The position history data 144 is data accumulated every time the control unit 150 updates a position of the virtual object. For example, the position history data 144 includes positions of a plurality of virtual objects that can be arranged in chronological order.

The acoustic data 145 is data used when the control unit 150 performs acoustic processing. For example, the acoustic data 145 is data used when acoustic processing is performed based on a head transfer function, and includes various types of data indicating acoustic characteristics of a model space. The head transfer function is Head-Related Transfer Function abbreviated as HRTF.

The basic sound data 146 is sound data used as a base when the control unit 150 performs the acoustic processing. The basic sound data 146 may be monaural sound data. In the present exemplary embodiment, the basic sound data 146 is stereo sound data of two channels.

A sound based on the basic sound data 146 and a sound obtained by performing the acoustic processing on the basic sound data 146 simply include a sound. In addition to a sound such as music, the sound may be a sound such as noise, sound of footsteps, and sound of wind, and sound effects, background sound, and the like used by AR software such as an AR game. Here, AR is an abbreviation for Argument Reality, and is also referred to as an augmented reality.

The control unit 150 includes a basic control unit 151, a capturing control unit 152, a position specification unit 153, a basic sound data acquisition unit 154, a sound output control unit 155, a basic video data acquisition unit 156, a video output control unit 157, and a sensor control unit 158. The video output control unit 157 corresponds to an example of a display control unit.

The basic control unit 151 executes a basic function controlling the components of the HMD 100. The basic control unit 151 performs start processing when the power of the HMD 100 is turned on, and initializes each of the components of the HMD 100. When the power of the controller 10 is turned off, the basic control unit 151 performs shut-down processing, and stops the HMD 100.

The capturing control unit 152 controls the outer camera 61 and the inner camera 68 to capture an image. The capturing control unit 152 acquires a captured image, and temporarily stores the captured image in the storage unit 140.

The position specification unit 153 specifies a position of a real object located in the imaging range of the outer camera 61 by analyzing the captured image of the outer camera 61. Further, the position specification unit 153 specifies a position of a virtual object displayed by the display unit 20.

The basic sound data acquisition unit 154 acquires the basic sound data 146 stored in the storage unit 140. In the present exemplary embodiment, a configuration in which the storage unit 140 stores the basic sound data 146 is illustrated, but a configuration may be adopted in which the HMD 100 acquires the basic sound data 146 from an external device or a device. For example, the basic sound data acquisition unit 154 may acquire, via the external memory interface 191, the basic sound data 146 from a memory device in which the sound data is recorded. Further, the basic sound data acquisition unit 154 may acquire the sound data received by the communication unit 117 from an external device.

The sound output control unit 155 performs the acoustic processing on the basic sound data 146 acquired by the basic sound data acquisition unit 154. The sound output control unit 155 generates a synthesized sound by the acoustic processing, and outputs a sound signal of the synthesized sound from the sound interface 181.

The basic video data acquisition unit 156 acquires the basic video data 143 stored in the storage unit 140.

The video output control unit 157 generates video data of a virtual object, based on the basic video data 143. The video output control unit 157 controls the display unit 20, based on the video data of the virtual object, and displays video of the virtual object on the display unit 20.

The sensor control unit 158 operates various sensors included in the HMD 100, and acquires detection values of the sensors.

4. Operation of Display System

Figure 5:
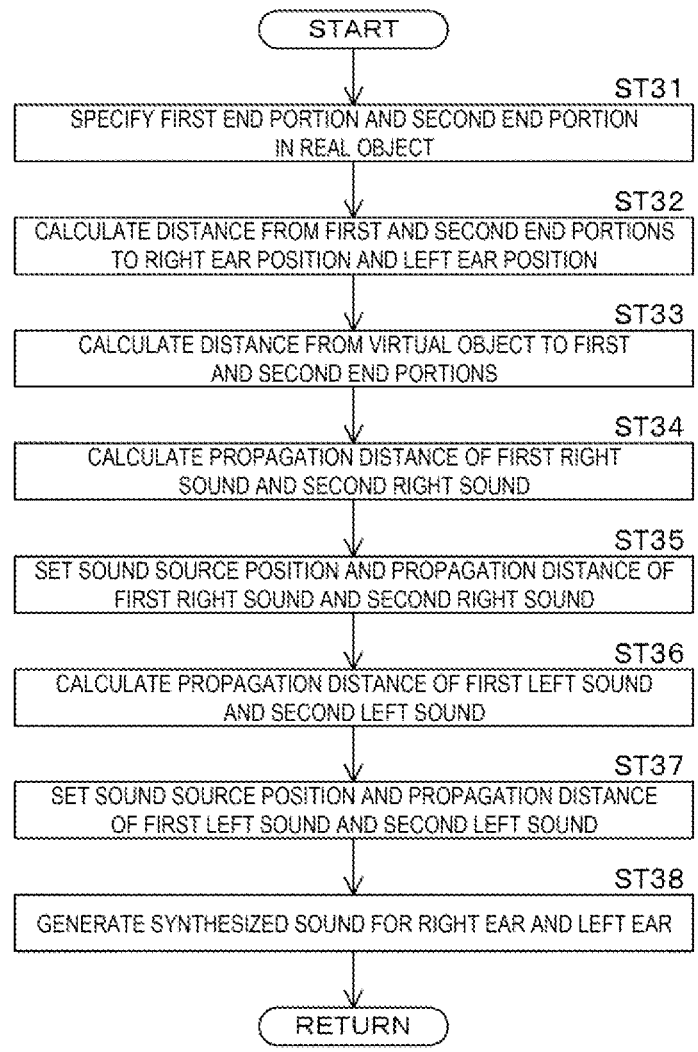
FIG. 5 is a flowchart illustrating operations of the HMD.
Figure 6:
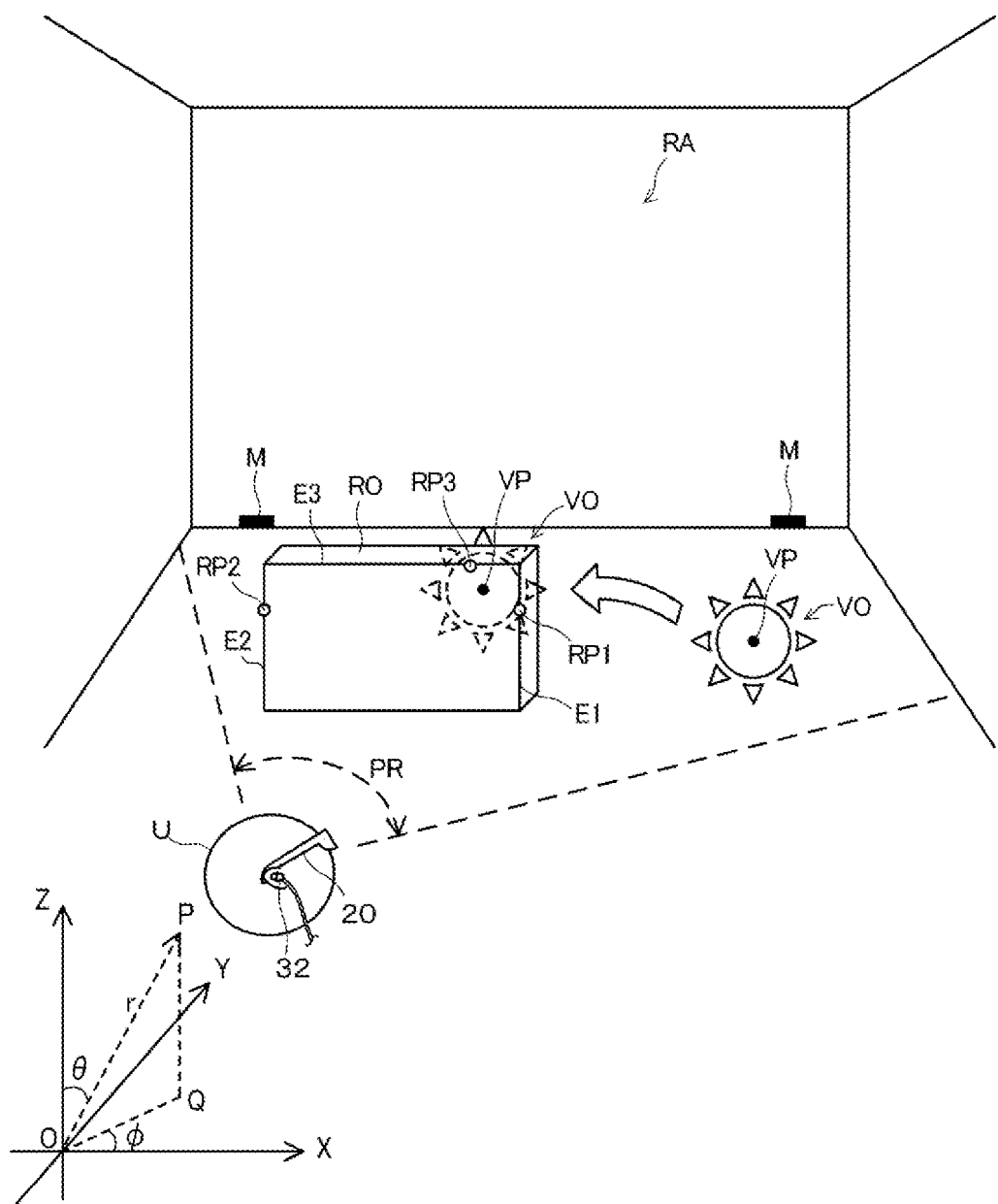
FIG. 6 is an explanatory diagram of an operation of the HMD.
Figure 7:
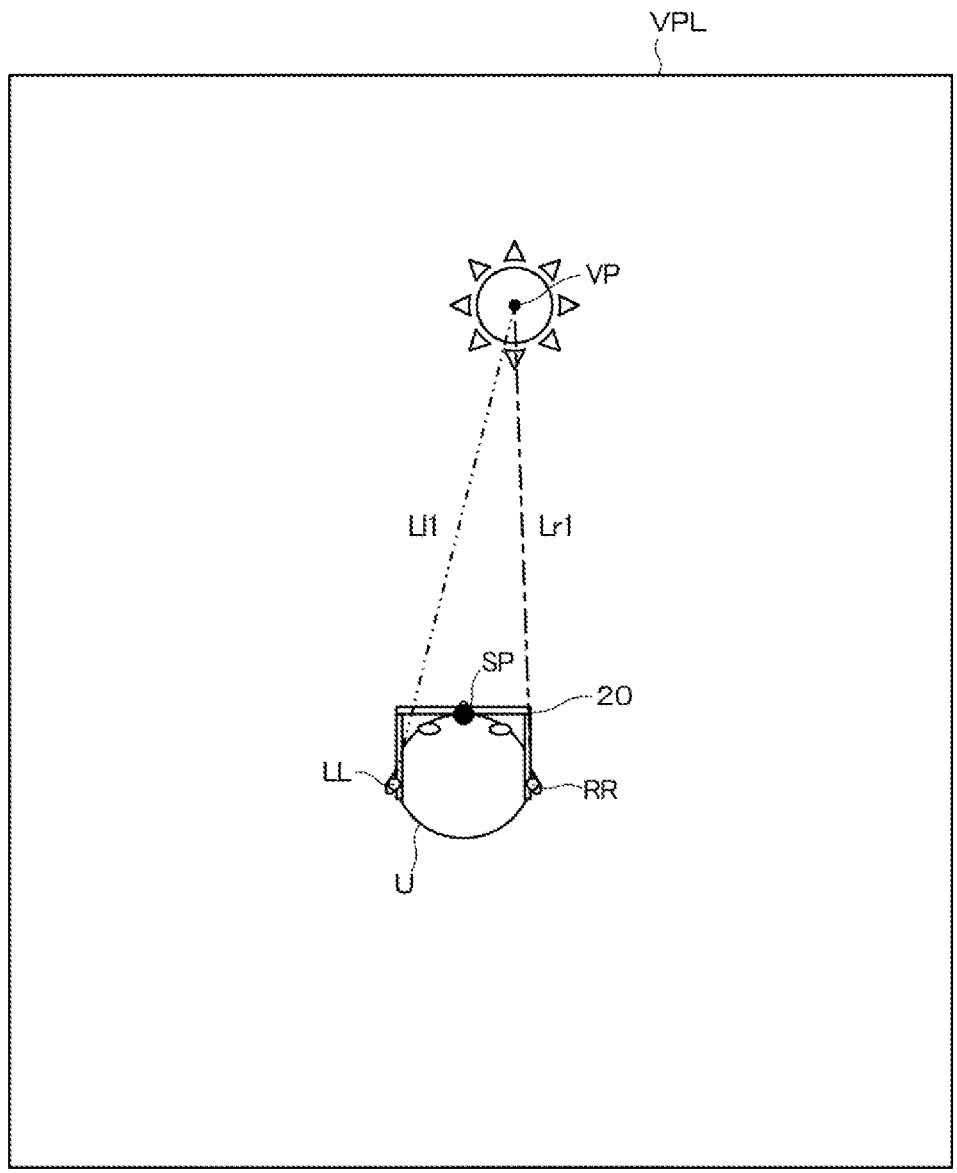
FIG. 7 is an explanatory diagram of an operation of the HMD.
Figure 8:
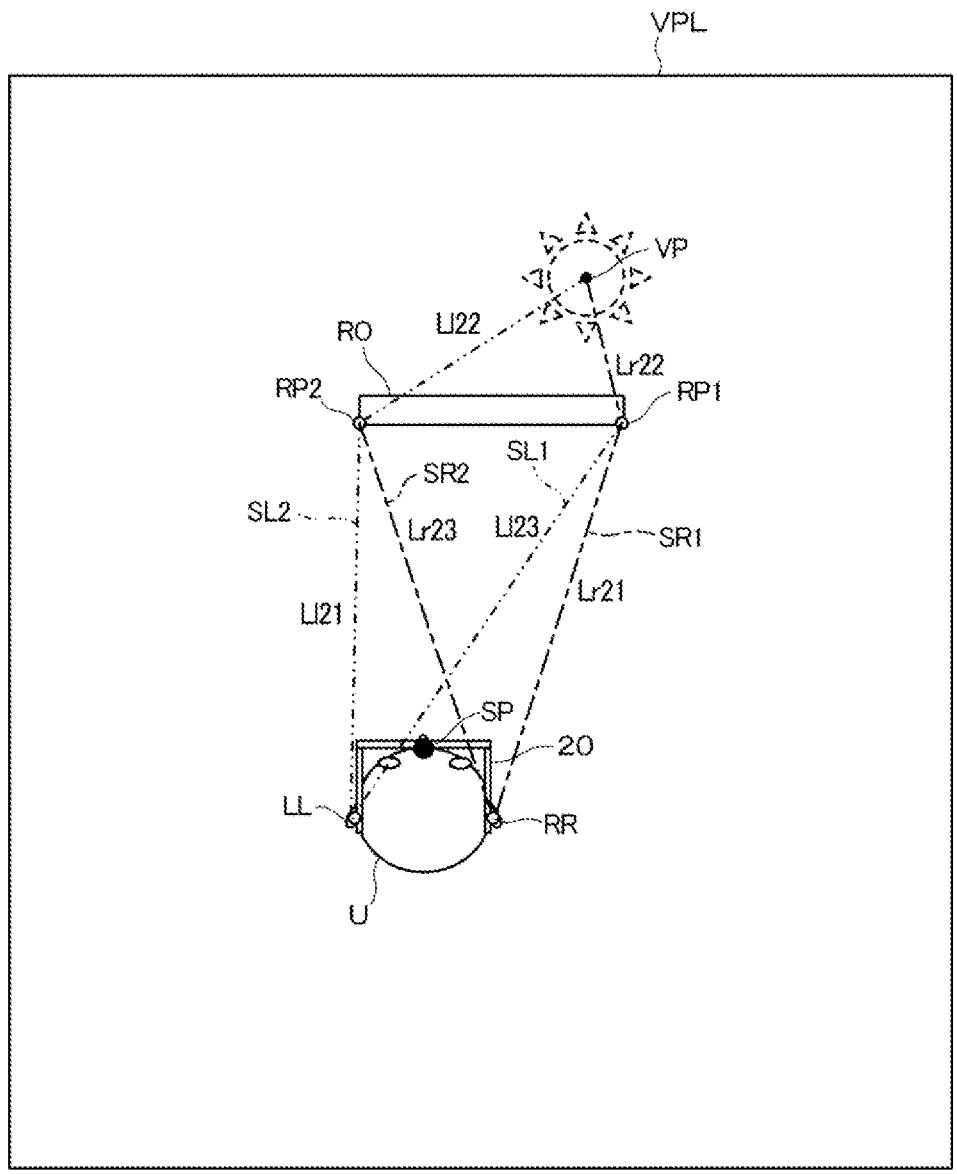
FIG. 8 is an explanatory diagram of an operation of the HMD.
Figure 9:
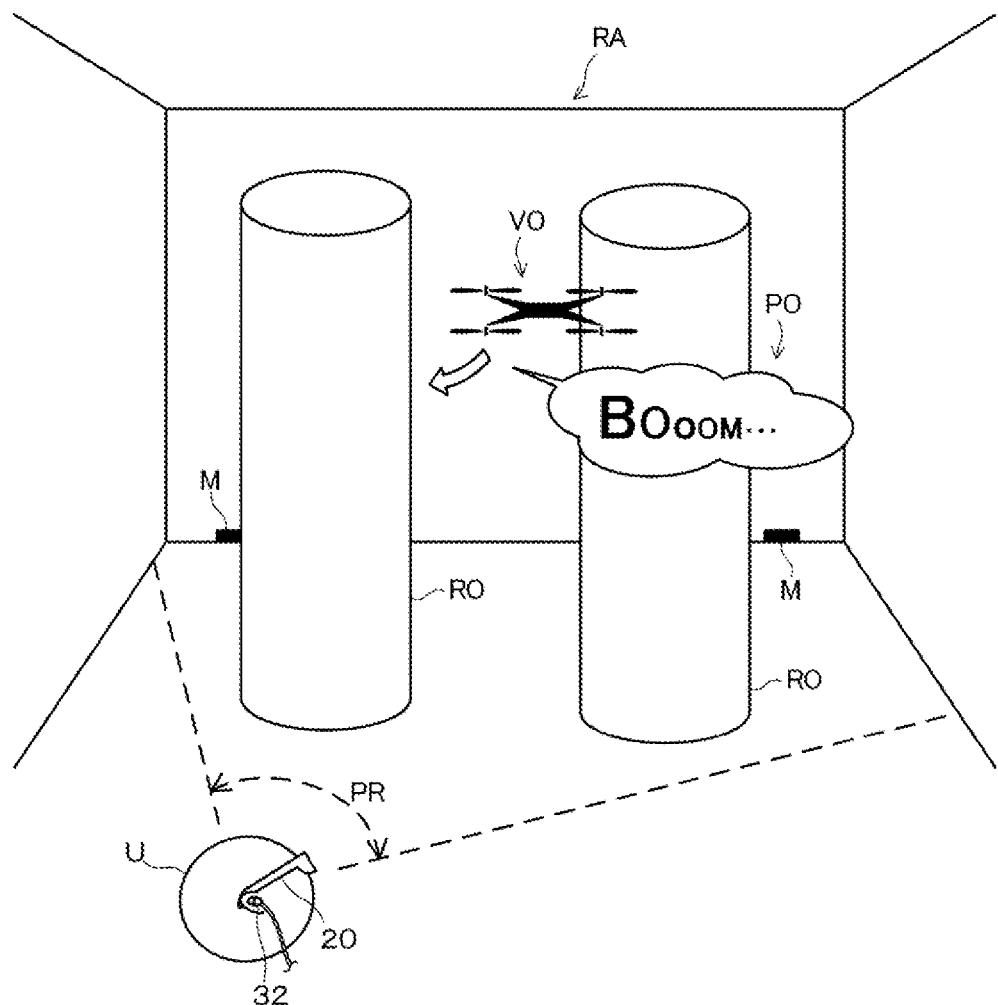
FIG. 9 is an explanatory diagram of an operation of the HMD.

FIGS. 4 and 5 are flowcharts illustrating operations of the HMD 100. FIGS. 6 to 9 are explanatory diagrams of an operation of the HMD 100. FIG. 6 is a diagram illustrating an example of a situation where the display system 1 operates. FIGS. 7 and 8 are diagrams illustrating an example of the acoustic processing performed by the HMD 100. FIG. 9 is a diagram illustrating another example of a situation where the display system 1 operates.

Hereinafter, with reference to the drawings, the operation of the display system 1 will be described.

FIG. 6 illustrates a state where the user U wearing the display unit 20 is in a real space RA. A real object RO being a real object is disposed in the real space RA. A marker M for position detection is disposed in the real space RA. The number of the markers M is not limited, and may be located in one or a plurality of places. The marker M may be detectable in a captured image of the outer camera 61. The marker M may be a real object, or a place where a wall or a floor in the real space RA is colored may be used as the marker M. The marker M corresponds to an example of an indicator.

In FIG. 6, an imaging range PR indicating an imaging range of the outer camera 61 by a reference sign PR moves in accordance with an orientation of the display unit 20.

The user U can visually recognize the real space RA including the real object RO through the display unit 20. The HMD 100 displays, by the display unit 20, a virtual object VO overlapping a scene in the real space RA. The virtual object VO is an image displayed by the display unit 20, but is a virtual reality that appears to the user U as if an object is present in the real space RA. A reference point VP illustrated in the drawing is a reference point of a position of the virtual object VO. The black dot indicating the reference point VP is not actually displayed.

The HMD 100 outputs a synthesized sound from the right earphone 32 and the left earphone 34. The synthesized sound is a sound that simulates a sound emitted from the virtual object VO. The synthesized sound is a sound subjected to the acoustic processing by the HMD 100 so as to be heard from the reference point VP of the virtual object VO. The acoustic processing performed in the present exemplary embodiment is processing based on a distance from the ear of the user U to the reference point VP and a direction of the reference point VP with reference to the head of the user U.

In the processing illustrated in FIG. 4, the video output control unit 157 acquires the basic video data 143 for displaying the virtual object VO (step ST11).

The capturing control unit 152 causes the outer camera 61 to capture an image, and acquires the captured image (step ST12). The position specification unit 153 detects the real object RO from the captured image of the outer camera 61 (step ST13). In step ST13, the position specification unit 153 analyzes the captured image, and thus cuts an image of an object located in the imaging range PR from the captured image. For example, the HMD 100 stores, as the setting data 142, data and parameters for detecting an image of the real object RO by pattern matching. In this case, the position specification unit 153 detects the real object RO from the captured image by pattern matching. The position specification unit 153 may detect a plurality of real objects RO from the captured image. Further, the position specification unit 153 may be able to detect the real object RO of a preset type, or may detect an unknown real object RO by an algorithm of an image analysis. Spatial recognition and/or object recognition may be performed by processing such as SLAM using a laser range scanner to detect the real object RO. SLAM is an abbreviation for Simultaneous Localization and Mapping.

The position specification unit 153 specifies a position of the real object RO detected in step ST13 and a position of the user U (step ST14). The position specification unit 153 determines a relative position of the real object RO with respect to the display unit 20, based on, for example, the position of the real object RO in the captured image. Further, the position specification unit 153 may determine a position and an angle of the display unit 20, based on a detected value of at least any sensor of the six-axis sensor 111, the magnetic sensor 113, the six-axis sensor 235, and the magnetic sensor 237. In this case, the position specification unit 153 may use the determined position and angle for the processing of determining a position of the real object RO with respect to the display unit 20.

In step ST14, the position specification unit 153 may specify a position of the real object RO and a position of the user U with reference to, for example, a specific position in the real space RA. For example, the position specification unit 153 may specify a relative position of the real object RO with reference to a position of the user U. Any method of representing a position can be used. For example, the position specification unit 153 may determine, in step ST14, a position of the user U and a position of the real object RO in the XYZ Cartesian coordinate system illustrated in FIG. 6. In this case, an origin position in the coordinate system may be the head of the user U. Specifically, a position of the center of the display unit 20 worn by the user U and a position of both ears of the user U estimated by the HMD 100 may be used as a reference. Further, a head reference position SP described later may be used as a reference.

For example, the position specification unit 153 estimates the size of the head of the user U from detected values of the right angle sensor 183 and the left angle sensor 184. Next, a position of the right ear and the left ear of the user U can be specified by applying the size of the head of the user U to a reference model of a head size and ear positions of human.

The position specification unit 153 may represent a relative position of the real object RO with respect to the user U by polar coordinates. For example, as illustrated in FIG. 6, a position P of the real object RO may be represented by an angle θ with respect to the Z axis, an angle φ according to a position Q obtained by projecting the position P on the XY plane, and a distance r to the position P. In this case, the origin may be coordinates fixed in the real space RA, or a position of the head of the user U may be the origin. In addition, any method of representing a position used by the position specification unit 153 can be used.

In step ST14, the position specification unit 153 may specify a position of the user U and a position of the real object RO by using the marker M. For example, the position specification unit 153 detects an image of the marker M located in the imaging range PR, based on the captured image. In this case, a position of the marker M in the real space RA is specified in advance, and information indicating the position of the marker M is included in the setting data 142. In the HMD 100, the position specification unit 153 can specify a position of the user U in the real space RA, based on a position of the image of the marker M in the captured image.

Further, in step ST14, the position specification unit 153 may specify a position of the user U and a position of the real object RO by a method different from the methods described above. For example, when a wireless beacon (not illustrated) is disposed in the real space RA, the communication unit 117 may specify a position of the user U by receiving a signal from the wireless beacon, and further specify a position of the real object RO, based on the captured image.

The location specification unit 153 specifies a position of the virtual object VO in the real space RA (step ST15). The position of the virtual object VO can be set to any position, and can be determined according to a content visually recognized as a video content by the user U. The position of the virtual object VO may be represented by the XYZ Cartesian coordinate system or the polar coordinates, and may be based on a specific position in the real space RA, or may be based on a position of the user U. For example, when video of a flying drone is caused to be visually recognized by the user U, a position of the virtual object VO is determined along pre-programmed trajectory of the drone.

The basic sound data acquisition unit 154 acquires, from the storage unit 140, the basic sound data 146 associated with the basic video data 143 acquired in step ST11 (step ST16). For example, when the basic video data 143 is video of a flying drone, the basic sound data acquisition unit 154 acquires the basic sound data 146 of a propeller sound of the drone.

The position specification unit 153 determines whether the virtual object VO is located in a position hidden by the real object RO in a visual field of the user U (step ST17). The position specification unit 153 makes the determination in step ST17 by comparing the position of the virtual object VO specified in step ST15 with the position of the user U and the position of the real object RO specified in step ST14.

For example, when the virtual object VO or the user U moves while the virtual object VO is displayed, the virtual object VO may be hidden by a shadow of the real object RO when viewed from the user U, as illustrated in FIG. 6. The state is a state where the real object RO is located between the user U and the virtual object VO.

When it is determined that the virtual object VO is located in a position hidden by the real object RO (step ST17; YES), the position specification unit 153 and the sound output control unit 155 perform the acoustic processing reflecting the sound going around the real object RO (step ST18). The acoustic processing in step ST18 generates a synthesized sound for the right ear and a synthesized sound for the left ear of the user U. The synthesized sound for the right ear is a sound output from the right earphone 32, and the synthesized sound for the left ear is a sound output from the left earphone 34.

When it is determined that the virtual object VO is not located in a position hidden by the real object RO (step ST17; NO), the position specification unit 153 sets a sound source position and a distance (step ST19). Specifically, the position specification unit 153 sets a sound source position and a distance from the virtual object VO to the right ear and the left ear of the user U, based on the position of the virtual object VO (step ST19). The sound output control unit 155 performs the acoustic processing on the basic sound data 146, based on the sound source position and the distance set in step ST19, and generates the synthesized sound for the right ear and the synthesized sound for the left ear of the user U (step ST20).

The sound output control unit 155 and the video output control unit 157 output the sound and update the display in the display unit 20 (step ST21). In other words, the sound output control unit 155 causes the sound interface 181 to output the synthesized sound generated in step ST18 or step ST20 from the right earphone 32 and the left earphone 34. The video output control unit 157 updates the image of the virtual object VO displayed by the display unit 20.

The basic control unit 151 determines whether to end the output of the video and the sound (step ST22). When the output does not end (step ST22; NO), the processing returns to step ST12. When the output ends, the processing ends.

Here, the acoustic processing in step ST18 and the acoustic processing in steps ST19 to ST20 will be described in detail.

FIG. 7 illustrates a state where the virtual object VO is not hidden by the real object RO. A reference sign VPL is a virtual plane including the reference point VP of the virtual object VO and the head reference position SP being a reference position of the head of the user U. The head reference position SP is located in the center of the front frame 27, for example. The head reference position SP may be the center of both ears of the user U estimated by the HMD 100. The position specification unit 153 specifies, in step ST14, a relative position of the head reference position SP and the reference point VP or a position in the real space RA.

The position specification unit 153 calculates a distance Lr1 from the reference point VP to the right ear of the user U, and a distance Ll1 from the reference point VP to the left ear. The distances Lr1 and Ll1 calculated here are distances in the virtual plane VPL. The processing of determining the distances Lr1 and Ll1 corresponds to step ST19.

In step ST20, the sound output control unit 155 performs the acoustic processing in response to the output of the sound based on the basic sound data 146 with the reference point VP as the sound source position. For example, the sound output control unit 155 calculates a difference in intensity between both ears and a difference in time between both ears, based on a difference between the distance Lr1 and the distance Ll1. The difference in intensity between both ears is a difference in volume between the synthesized sound for the right ear and the synthesized sound for the left ear. The difference in time between both ears is a difference in time between the synthesized sound for the right ear and the synthesized sound for the left ear. The sound output control unit 155 performs the acoustic processing to reflect, in the basic sound data 146, the difference in intensity between both ears and the difference in time between both ears, and generates the synthesized sound for the right ear and the synthesized sound for the left ear. Furthermore, the sound output control unit 155 may perform processing to provide a difference in frequency component between the synthesized sound for the right ear and the synthesized sound for the left ear, based on HRTF. The difference in frequency component is calculated based on the relative position of the head reference position SP and the reference point VP in the Z-axis direction in FIG. 6. In this way, a sound with a sense of realism that reflects a position of the virtual object VO can be output.

FIG. 8 illustrates a state where the virtual object VO is hidden by the real object RO. The state in FIG. 8 is a typical example in which the processing in step ST18 is applied. The sound output control unit 155 reproduces an acoustic state where the synthesized sound using the virtual object VO as the sound source position goes around end portions of the real object RO and reaches both ears of the user U. In FIG. 8, a position of the right ear of the user U is indicated by a reference sign RR, and a position of the left ear of the user U is indicated by a reference sign LL. The right ear position RR is a position in which the right earphone 32 is mounted, and the left ear position LL is a position in which the left earphone 34 is mounted.

The processing in step ST18 will be described with reference to FIG. 8 and the flowchart in FIG. 5.

The position specification unit 153 specifies a first end portion RP1 and a second end portion RP2 in the real object RO (step ST31). As illustrated in FIG. 6, the first end portion RP1 and the second end portion RP2 are located at left and right end portions of an outer edge portion of the real object RO close to the head reference position SP. In FIG. 6, the first end portion RP1 is located on an end portion E1 on the right side, and the second end portion RP2 is located on an end portion E2 on the left side. The end portion E1 is an end portion on the right side of the outer edge of the real object RO, and is a position closest to the head reference position SP. The end portion E2 is an end portion on the left side of the outer edge of the real object RO, and is a position closest to the head reference position SP. Here, the right and left refer to the user U. The first end portion RP1 is a point on the virtual plane VPL at the end portion E1, and the second end portion RP2 is a point on the virtual plane VPL at the end portion E2.

There are a plurality of paths that the sound emitted from the reference point VP reaches the ear of the user U. Specifically, the sound going around the first end portion RP1 from the reference point VP reaches the right ear position RR. The sound is referred to as a first right sound SR1. Further, the sound going around the second end portion RP2 from the reference point VP reaches the right ear position RR. The sound is referred to as a second right sound SR2. The sound going around the first end portion RP1 from the reference point VP reaches the left ear position LL. The sound is referred to as a first left sound SL1. Further, the sound going around the second end portion RP2 from the reference point VP reaches the left ear position LL. The sound is referred to as a second left sound SL2.

A path that the sound emitted from the reference point VP reaches the ear of the user U is not strictly limited to the first end portion RP1 and the second end portion RP2. In the present exemplary embodiment, in order to effectively increase a sense of reality when the user U listens with the right and left ears, the first end portion RP1 and the second end portion RP2 are specified at the right and left end portions of the real object RO, and the synthesized sound is adjusted with reference to positions of the first end portion RP1 and the second end portion RP2.

The position specification unit 153 calculates distances from the first end portion RP1 and the second end portion RP2 to the right ear position RR and the left ear position LL (step ST32). Specifically, a distance Lr21 from the first end portion RP1 to the right ear position RR, a distance Ll21 from the second end portion RP2 to the left ear position LL, a distance Lr23 from the second end portion RP2 to the right ear position RR, and a distance Ll23 from the first end portion RP1 to the left ear position LL are calculated.

The position specification unit 153 calculates a distance Lr22 from the reference point VP to the first end portion RP1 and a distance Ll22 from the reference point VP to the second end portion RP2 (step ST33).

The position specification unit 153 calculates a propagation distance of the first right sound SR1 and the second right sound SR2 (step ST34). The propagation distance of the first right sound SR1 is a sum of the distance Lr21 and the distance Lr22. The propagation distance of the second right sound SR2 is a sum of the distance Lr23 and the distance Ll22.

The sound output control unit 155 sets a sound source position of the first right sound SR1 to the first end portion RP1, sets a sound source position of the second right sound SR2 to the second end portion RP2, and sets the propagation distance calculated in step ST34 (step ST35). The first right sound SR1 is a sound emitted from the reference point VP, but goes around the real object RO and thus propagates from the first end portion RP1 toward the right ear position RR. Thus, by considering the first end portion RP1 as the position of the sound source of the first right sound SR1, a sound emitted from a real object can be appropriately reproduced. Similarly to the second right sound SR2, it is appropriate to set a sound source position to the second right sound SR2. The same applies to the first left sound SL1 and the second left sound SL2.

The position specification unit 153 calculates a propagation distance of the first left sound SL1 and the second left sound SL2 (step ST36). The propagation distance of the first left sound SL1 is a sum of the distance Ll23 and the distance Lr22. The propagation distance of the second left sound SL2 is a sum of the distance Ll21 and the distance Ll22.

The sound output control unit 155 sets a sound source position of the first left sound SL1 to the first end portion RP1, sets a sound source position of the second left sound SL2 to the second end portion RP2, and sets the propagation distance calculated in step ST36 (step ST37).

The sound output control unit 155 performs the acoustic processing on the basic sound data 146, based on the sound source position and the propagation distance set in step ST35, and generates sound data of the synthesized sound for the right ear and the left ear (step ST38).

Specifically, the sound output control unit 155 calculates a difference in intensity between both ears and a difference in time between both ears, based on the sound source position and the propagation distance set in steps ST35 and ST37, and generates the synthesized sound for the right ear and the synthesized sound for the left ear by performing the acoustic processing on the basic sound data 146. The processing based on the difference in intensity between both ears and the difference in time between both ears is processing of reproducing a sound image orientation of a sound source by a difference in intensity between sound waves reaching the ears and a difference in time at which the sound waves reach. Here, the sound output control unit 155 may perform processing to provide a difference in frequency component based on HRTF. The processing is processing of reproducing a sound image orientation of a sound source by a change in frequency characteristic due to transmission and shielding of sound waves. Further, the sound output control unit 155 may perform the acoustic processing of reproducing a sound image orientation of a sound source by a change in phase due to transmission and shielding of sound waves by performing processing of adjusting a phase on the basic sound data 146. Further, the sound output control unit 155 may perform the acoustic processing on the basic sound data 146, based on an impulse response indicating reverberation characteristics of a space.

The sound going around the first end portion RP1 is a sound that reaches the ear of the user U from a position hidden by the real object RO via the first end portion RP1. The sound goes around the first end portion RP1, and thus refraction, diffraction, interference, reflection, and the like of the sound occur. In this way, the user U can hear the sound including a beat, resonance, and reverberation of the sound. The same applies to the sound going around the second end portion RP2. As the acoustic processing of reproducing a sound going around the first end portion RP1, the sound output control unit 155 performs the acoustic processing so as to produce a sound including at least any of a beat, resonance, and reverberation of the sound due to occurrence of at least any of refraction, diffraction, interference, reflection, and the like of the sound. The same applies to the sound going around the second end portion RP2.

As described above, the HMD 100 according to the exemplary embodiment to which the present disclosure is applied includes the display unit 20 mounted on the head of the user U, and configured to display an image such that the real object RO located in the real space is visually recognizable, and the right earphone 32 and the left earphone 34 configured to output a sound. The HMD 100 includes the position specification unit 153 configured to specify a position of the real object RO and the virtual object VO, and the sound output control unit 155 configured to generate a synthesized sound with the position of the virtual object VO as a sound source position, and output the synthesized sound from the right earphone 32 and the left earphone 34. The sound output control unit 155 adjusts the synthesized sound to change three-dimensionally according to the real object RO when the position of the real object RO is located between the position of the virtual object VO and a position of the display unit 20.

The display system 1 includes the head-mounted display unit 20 mounted on the head of the user U, and configured to display an image such that the real object RO located in the real space is visually recognizable, and the right earphone 32 and the left earphone 34 configured to output a sound. The display system 1 includes the position specification unit 153 configured to specify a position of the real object RO and the virtual object VO, and the sound output control unit 155 configured to generate a synthesized sound with the position of the virtual object VO as a sound source position, and output the synthesized sound from the right earphone 32 and the left earphone 34. Further, the display system 1 includes the video output control unit 157 configured to display an image of the virtual object VO on the display unit 20, based on the position of the virtual object VO specified by the position specification unit 153. The sound output control unit 155 adjusts the synthesized sound to change three-dimensionally according to the real object RO when the position of the real object RO is located between the position of the virtual object VO and a position of the display unit 20.

The sound image output method performed by the HMD 100 specifies a position of the real object RO and the virtual object VO. Further, the sound image output method displays an image of the virtual object VO on the display unit 20, based on the specified position of the virtual object VO. Further, the sound image output method generates a synthesized sound with the position of the virtual object VO as a sound source position. Further, the sound image output method adjusts the synthesized sound to change three-dimensionally according to the real object RO when the position of the real object RO is located between the position of the virtual object VO and a position of the display unit 20. Further, the sound image output method outputs the adjusted synthesized sound from the right earphone 32 and the left earphone 34.

The HMD 100, the display system 1 using the HMD 100, and the sound image output method performed by the HMD 100 can adjust, according to a positional relationship between the virtual object VO and the real object RO, a sound that simulates a sound emitted from the virtual object VO. In this way, a sound with a sense of reality can be output as if the virtual object VO actually outputs the sound. Therefore, an image of the virtual object VO displayed by the display unit 20 and the adjusted sound allows the user U to experience an augmented reality with a sense of reality.

The sound output control unit 155 adjusts the synthesized sound so that the synthesized sound becomes an audible sound bypassing the real object RO. In this way, going-around of the sound can be reproduced, and the sound with a more sense of reality can be output.

The HMD 100 includes the basic sound data acquisition unit 154 configured to acquire the basic sound data 146, and the sound output control unit 155 generates the synthesized sound by processing using the position of the virtual object VO as a sound source position of the basic sound data 146. With the configuration, a sound that simulates a sound in a state of being output from the virtual object VO can be rapidly generated by using the basic sound data 146.

The HMD 100 includes the right earphone 32 and the left earphone 34 as the sound output unit, and the synthesized sound includes a synthesized sound for the right ear as a first sound and a synthesized sound for the left ear as a second sound. The sound output control unit 155 outputs the first sound from the right earphone 32, and outputs the second sound from the left earphone 34. The position specification unit 153 specifies a position of the first end portion RP1 and the second end portion RP2 at the outer edge of the real object RO. The sound output control unit 155 adjusts a difference in time and a difference in intensity between the synthesized sound output from the right earphone 32 and the synthesized sound output from the left earphone 34, based on the position of the first end portion RP1, the position of the second end portion RP2, a position of the right earphone 32, and a position of the left earphone 34. In this way, a state where the sound emitted from the virtual object VO goes around the real object RO can be more accurately reproduced. Therefore, the user U can hear a sound heard by going around from a position hidden by the real object RO.

The HMD 100 includes the outer camera 61. The position specification unit 153 performs processing of detecting the real object RO from a captured image of the outer camera 61 and specifying a position of the real object RO, and processing of specifying a position of the first end portion RP1 and a position of the second end portion RP2. In this way, specification of the position of the real object RO and the specification of the position where the sound goes around can be rapidly performed based on the captured image.

The position specification unit 153 detects the marker M disposed in the real space from the captured image of the outer camera 61, and specifies a position of the virtual object VO with reference to a position of the marker M. According to the configuration, specification of the position of the virtual object VO can be rapidly performed by using the marker M.

The sound output control unit 155 adjusts the synthesized sound according to a distance from the position of the virtual object VO specified by the position specification unit 153 to the user U. In this way, a state where a sound propagates from the position of the virtual object VO to the ears of the user U can be reproduced with high accuracy. Therefore, the user U can hear a sound with a more sense of reality.

5. Other Exemplary Embodiments

The present disclosure is not limited to the configurations in the exemplary embodiment described above, and can be implemented in various aspects without departing from the gist of the disclosure.

For example, the video output control unit 157 may add performance to video displayed by the display unit 20 in response to the acoustic processing performed by the sound output control unit 155.

FIG. 9 is a diagram illustrating an example of an operation of the HMD 100, and illustrates an example of performing display performance in response to the acoustic processing. In FIG. 9, an image of the virtual object VO that simulates a drone is displayed according to the reference point VP. When the reference point VP is hidden by the real object RO, the video output control unit 157 displays a performance object PO according to a position of the real object RO, a position of the reference point VP, and a position of the user U that are specified by the position specification unit 153. The performance object PO is an image indicating, by a character, a sound output by the sound output control unit 155 from the right earphone 32 and the left earphone 34, and has a change in character size so as to represent a state of the acoustic processing. In this example, the sound output control unit 155 performs the acoustic processing, and also performs display according to the acoustic processing, and thus an augmented reality experience with a more sense of realism can be achieved.

Further, a plurality of sound source positions may be set for the virtual object VO. For example, in the virtual object VO illustrated in FIG. 9, a position of each of four propellers may be a sound source position. In this case, the position specification unit 153 may specify the respective sound source positions, and specify the respective sound source positions and a position of the real object RO. The sound output control unit 155 may perform the acoustic processing on the individual sound source positions in order to reproduce a sound output from each of the plurality of sound source positions, and perform processing of synthesizing the sounds.

Further, the acoustic processing of a frequency component based on HRTF performed by the sound output control unit 155 in the exemplary embodiment described above may be approximate processing using a model of spatial characteristics. Further, the position specification unit 153 may determine a type and a state of the real space RA, and change the acoustic processing in accordance with the determination result. Further, the position specification unit 153 may determine a shape of the real object RO, and the sound output control unit 155 may perform processing in accordance with the shape of the real object RO.

The video output control unit 157 may display a plurality of virtual objects VO. In this case, the position specification unit 153 may specify positions of the plurality of virtual objects VO, a position of the real object RO, and a position of the user U. The sound output control unit 155 may perform the acoustic processing on the synthesized sound emitted from any of the virtual objects VO, based on relative positions of the plurality of virtual objects VO.

Further, the control unit 150 may specify a posture of the head of the user U wearing the display unit 20, based on a detection result of the six-axis sensor 235 and/or the magnetic sensor 237. In other words, the control unit 150 may include a posture specification unit. In this case, the sound output control unit 155 may adjust the synthesized sound according to a posture of the head of the user U specified by the posture specification unit.

The control unit 150 may specify a line-of-sight direction of the user U, based on a detection result of the six-axis sensor 235 and/or the magnetic sensor 237 or a captured image of the inner camera 68. In other words, the control unit 150 may include a line-of-sight specification unit. The sound output control unit 155 may adjust the synthesized sound according to a line-of-sight direction of the user U specified by the line-of-sight specification unit.

A device that processes a display image of the display unit 20 and/or a sound output from the right earphone 32 and the left earphone 34 is not limited to the controller 10. The HMD 100 may use an external control device instead of controller 10. The control device may be, for example, a smartphone, a PDA terminal, and a tablet personal computer.

Further, in the exemplary embodiments described above, the configuration in which the controller 10 is coupled to the display unit 20 in a wired manner is illustrated. However, the present disclosure is not limited thereto, and the display unit 20 may be configured to be coupled to the control device 10 in a wireless manner. The controller 10 may also be achieved by a plurality of devices. Further, instead of the controller 10, a wearable device that can be attached to the body or clothes of the user, or to the personal adornments worn by the user may be used. The wearable device in such a case may be, for example, a watch-like device, a ring-like device, a laser pointer, a mouse, an air mouse, a game controller, a pen-like device, or the like.

In addition, in the exemplary embodiments described above, the configuration in which the display unit 20 and the controller 10 are separated, and are coupled via the coupling cable 40 is illustrated as an example. The present disclosure is not limited thereto, and the controller 10 and the display unit 20 may be configured as one part, and worn by the user on the head.

Further, the display unit 20 is not limited to being mounted directly on the head of the user U. Instead of the display unit 20, for example, an image display unit of another type such as an image display unit worn as a hat may be adopted.

A configuration in which a virtual image is formed by the half mirrors 261 and 281 on a part of the right light-guiding plate 26 and the left light-guiding plate 28 is illustrated as an optical system configured to guide imaging light to the eyes of the user. The present disclosure is not limited thereto, and an image may be displayed either on the entire surface of the right light-guiding plate 26 and the left light-guiding plate 28, or in a display region having an area that occupies most part of the right light-guiding plate 26 and the left light-guiding plate 28. In such a case, processing of reducing an image may be included in an operation for changing a display position of the image.

In addition, the optical elements are not limited to the right light-guiding plate 26 and the left light-guiding plate 28 including the half mirrors 261 and 281, and any optical components that allow the imaging light to enter the eyes of the user, specifically, diffraction grating, prisms, and holographic display units may be employed.

Furthermore, in the exemplary embodiment described above, the configuration is described where the display unit 20 generates imaging light by the OLED units 221 and 241. However, the present disclosure is not limited thereto. For example, in the right display unit 22 and the left display unit 24, a transmissive liquid crystal panel may be employed, instead of the transmissive liquid crystal panel, a reflective liquid crystal panel may be employed, and a digital micromirror device may be employed. Furthermore, a configuration in which an LCOS technique is applied instead of an LCD panel may be used. LCOS is an abbreviation for Liquid Crystal On Silicon.

The display unit 20 may be configured to use a self-light-emitting type display element represented by an LED array, a laser array, a quantum dot light emitting element, and the like. The display unit 20 may be, for example, a laser scanning type display in which a laser light source and a laser scanner are combined.

Figure 2:
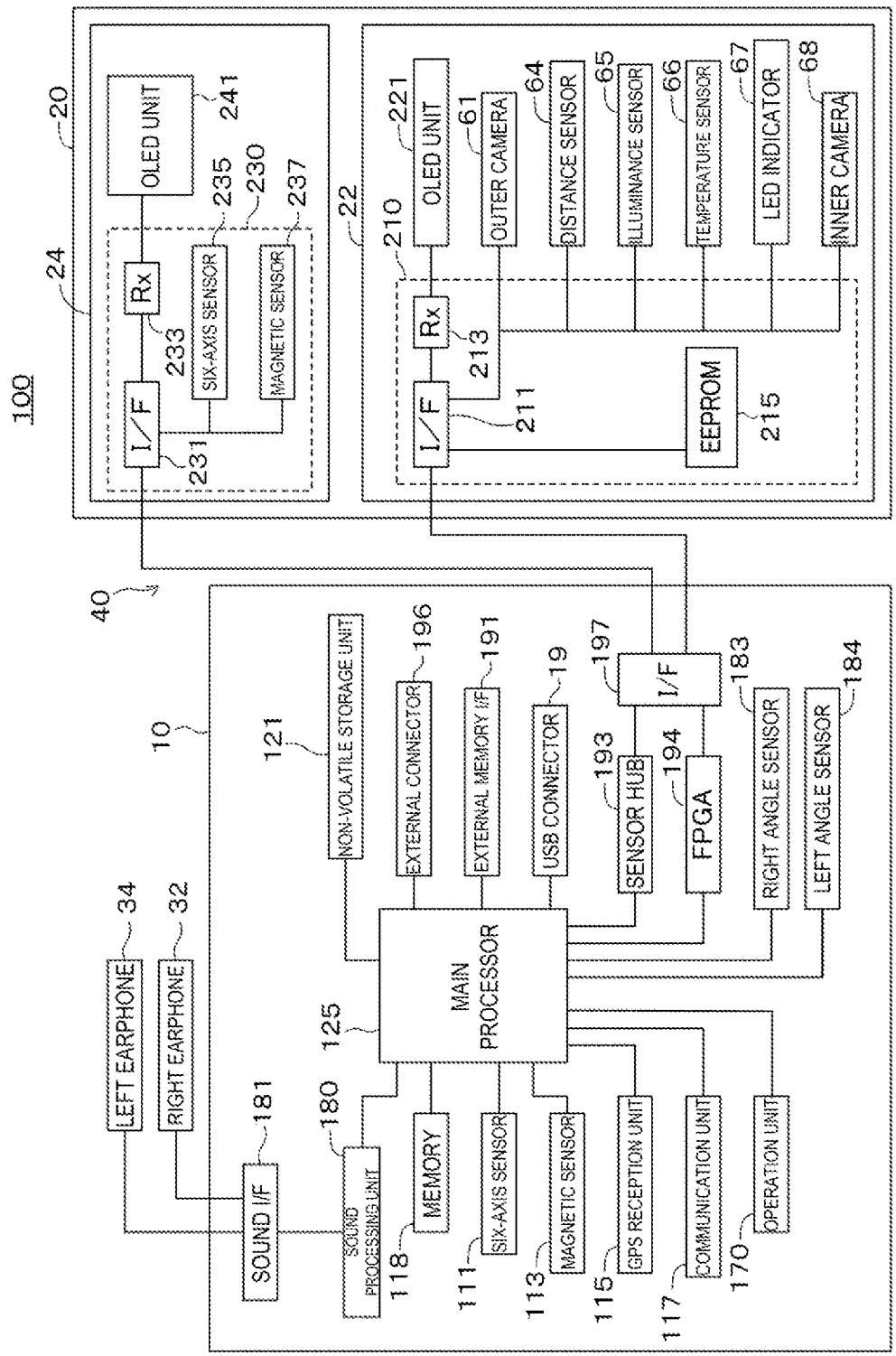
FIG. 2 is a block diagram of an HMD.

In addition, such a configuration may be adopted that at least some of the function blocks illustrated in FIGS. 2 and 3 and the like are achieved with hardware, or achieved together with hardware and software, and the present disclosure is not limited to a configuration in which independent hardware resources are arranged as illustrated in the drawings.

Further, processing units in the flowcharts illustrated in FIGS. 4 and 5 are obtained by dividing the processing based on main processing contents in order to facilitate the understanding of the processing in the control unit 150. The exemplary embodiments are not limited by a manner of dividing the processing units in each of the flowcharts, and names. An order of the processing in the above-described flowchart is also not limited to the illustrated example.

The program executed by the main processor 125 may be stored in an external device or a device, and may be acquired via the communication unit 117 or the like. Furthermore, the program can also be recorded in a recording medium recorded so as to be readable by a computer. The recording medium can be a magnetic recording medium, an optical recording medium, or a semiconductor memory device. Specifically, examples of a portable or stationary type recording medium include a flexible disk, various optical disks, a magneto-optical disk, a flash memory, and a card-type recording medium. The recording medium may be non-volatile storage devices such as a RAM, a ROM, and an HDD, all representing internal storages included in an image display apparatus.

What is claimed is:

1. A head-mounted display apparatus, comprising:
   a display unit mounted on a head of a user, and configured to display an image such that a real object located in a real space is visually recognizable;
   a sound output unit configured to output a sound;
   a position specification unit configured to determine whether a position of the real object is located between a position of a virtual object and a position of the display unit; and
   a sound output control unit configured to generate a synthesized sound with the position of the virtual object as a sound source position, and output the synthesized sound from the sound output unit, wherein
      the sound output control unit adjusts the synthesized sound to change three-dimensionally based on end portions of the real object when the position specification unit determines that the position of the real object is located between the position of the virtual object and the position of the display unit, and
      the sound output control unit outputs the synthesized sound based on a direct distance from the virtual image to the sound output unit when the position specification unit determines that the position of the real object is not located between the position of the virtual object and the position of the display unit.

2. The head-mounted display apparatus according to claim 1, wherein
   the sound output control unit adjusts the synthesized sound so that the synthesized sound becomes an audible sound bypassing the real object.

3. The head-mounted display apparatus according to claim 1, comprising
   a basic sound data acquisition unit configured to acquire basic sound data, wherein
   the sound output control unit generates the synthesized sound by processing using the position of the virtual object as a sound source position of the basic sound data.

4. The head-mounted display apparatus according to claim 1, comprising
   a first sound output unit and a second sound output unit as the sound output unit, wherein
   the synthesized sound includes a first sound and a second sound,
   the sound output control unit outputs the first sound from the first sound output unit, and outputs the second sound from the second sound output unit,
   the position specification unit specifies a position of a first end portion and a second end portion at an outer edge of the real object, and
   the sound output control unit adjusts a difference in time and a difference in intensity between the synthesized sound output from the first sound output unit and the synthesized sound output from the second sound output unit, based on the position of the first end portion, the position of the second end portion, a position of the first sound output unit, and a position of the second sound output unit.

5. The head-mounted display apparatus according to claim 4, comprising
   an imaging unit, wherein
   the position specification unit performs processing of detecting the real object from a captured image of the imaging unit and specifying a position of the real object, and processing of specifying a position of the first end portion and a position of the second end portion.

6. The head-mounted display apparatus according to claim 5, wherein
   the position specification unit detects an indicator disposed in the real space from the captured image of the imaging unit, and specifies a position of the virtual object with reference to a position of the indicator.

7. The head-mounted display apparatus according to claim 1, wherein the sound output control unit adjusts the synthesized sound according to a distance from the position of the virtual object specified by the position specification unit to the user.

8. A sound image output system, comprising:
   a head-mounted display unit mounted on a head of a user, and configured to display an image such that a real object located in a real space is visually recognizable;
   a sound output unit configured to output a sound;
   a position specification unit configured to determine whether a position of the real object is located between a position of a virtual object and a position of the display unit;
   a sound output control unit configured to generate a synthesized sound with the position of the virtual object as a sound source position, and output the synthesized sound from the sound output unit; and a display control unit configured to display an image of the virtual object on the display unit, based on the position of the virtual object specified by the position specification unit, wherein the sound output control unit adjusts the synthesized sound to change three-dimensionally based on end portions of the real object when the position specification unit determines that the position of the real object is located between the position of the virtual object and the position of the display unit, and the sound output control unit outputs the synthesized sound based on a direct distance from the virtual image to the sound output unit when the position specification unit determines that the position of the real object is not located between the position of the virtual object and the position of the display unit.

9. A sound image output method using a head-mounted display unit mounted on a head of a user, and configured to display an image such that a real object located in a real space is visually recognizable, and a sound output unit configured to output a sound, the sound image output method comprising:

determining whether a position of the real object is located between a position of a virtual object and a position of the display unit;

displaying an image of the virtual object on the display unit, based on the specified position of the virtual object;

generating a synthesized sound with the position of the virtual object as a sound source position;

adjusting the synthesized sound to change three-dimensionally based on end portions of the real object when the position of the real object is located between the position of the virtual object and the position of the display unit; and outputting the synthesized sound based on a direct distance from the virtual image to the sound output unit when the position of the real object is not located between the position of the virtual object and the position of the display unit.

* * * * *